Dec. 20, 1938.  J. HIRSHSTEIN  2,140,581
GREASE INTERCEPTOR
Filed Nov. 15, 1935  2 Sheets-Sheet 1

INVENTOR.
JOSEPH HIRSHSTEIN
BY Bates, Goldrick, & Teare
ATTORNEYS

Dec. 20, 1938.  J. HIRSHSTEIN  2,140,581
GREASE INTERCEPTOR
Filed Nov. 15, 1935  2 Sheets-Sheet 2

INVENTOR.
JOSEPH HIRSHSTEIN
BY Bates, Golrick, & Teare
ATTORNEYS

Patented Dec. 20, 1938

2,140,581

UNITED STATES PATENT OFFICE 2,140,581

GREASE INTERCEPTOR

Joseph Hirshstein, Cleveland, Ohio

Application November 15, 1935, Serial No. 50,000

10 Claims. (Cl. 210—56)

This invention relates to an apparatus for reclaiming fatty waste materials, oils and grease from waste waters and has particular application to the maintenance of a constant water level in such apparatus so that the accumulated fatty material may be collected and removed by mechanical means.

In water clarifying apparatuses, or what are commonly known as oil or grease interceptors, the basin in which the fatty material is allowed to accumulate, should be sealed from the air. Building, plumbing and sanitation codes specify this as a requirement. A water seal or trap must also be provided, where the basin is connected to the sewer. Thus, in a grease interceptor construction wherein the air above the level of the water in the basin is sealed from the atmosphere, many difficulties arise with respect to the operation of the interceptor and the maintenance of the water level therein.

The maintenance of a steady, constant water level in the interceptor basin, is of primary importance. A quiescent steady level will have the effect of accumulating more grease and fatty material on the surface of the water than one which has a tendency to fluctuate. A fluctuating water level produces agitation in the quiescent zone of the interceptor and thereby much of the fatty material, which would otherwise be separated, remains in suspension in the water. A further advantage of maintaining a constant water level is found where mechanical means are employed to skim off the fatty waste material from the surface of the water. If the level is not maintained, it is obvious that mechanical means for removing the fatty waste material from the surface of the water become complicated. If the level is too low, only a portion of the grease will be removed, and in the alternative, if the level is too high, grease and waste water will be removed together.

Having in mind the difficulties experienced in the operation of grease interceptors, it is therefore the primary object of my invention to maintain a steady and constant water level in the basin of the interceptor, and particularly in the quiescent zone where the fatty and oil waste material collects.

It is a further object of my invention to provide a self-venting interceptor which can be used without a vent line and so that an accumulation of trapped, compressed air and gases above the water level cannot affect the operation of the clarifying apparatus.

Figure 1:
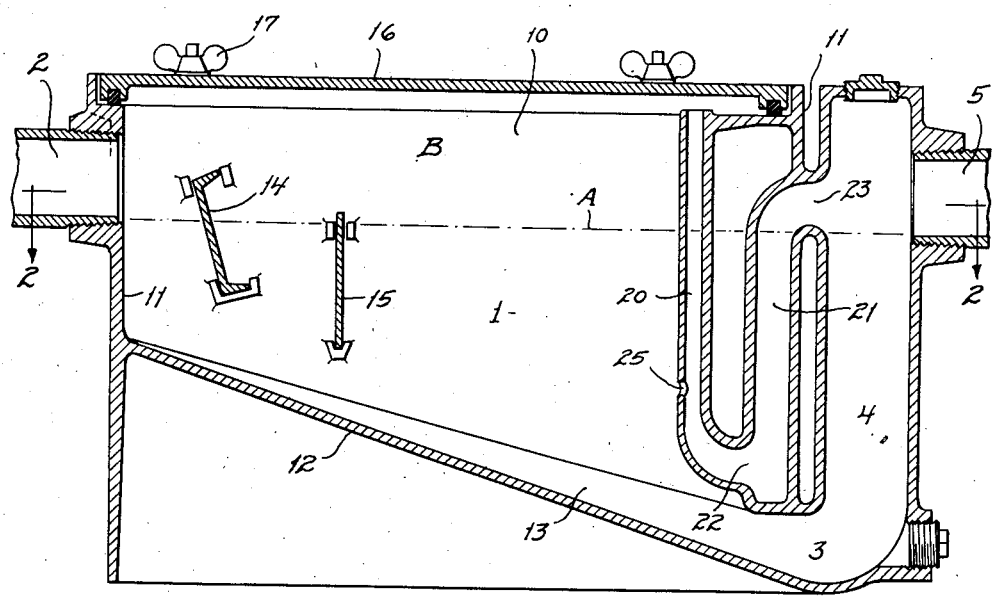
Figure 2:
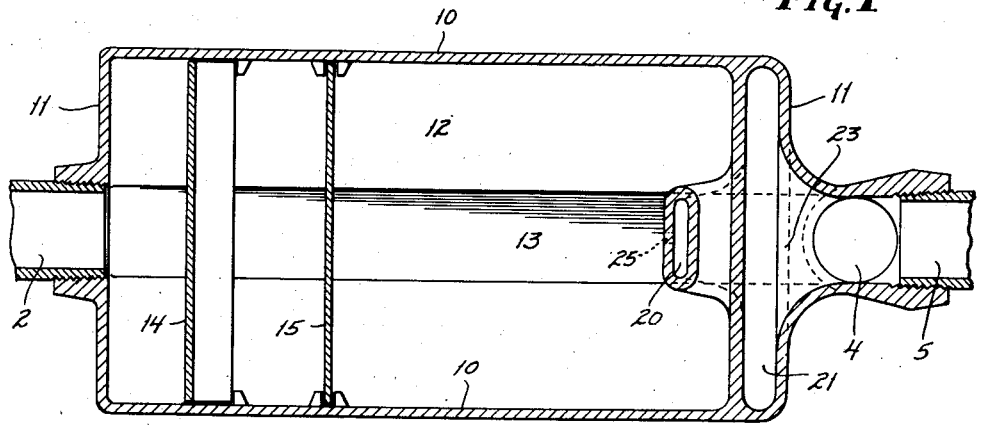
Figure 3:
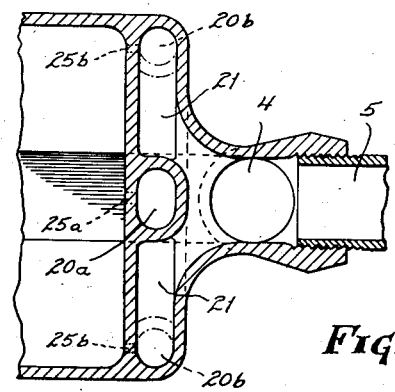
Figure 4:
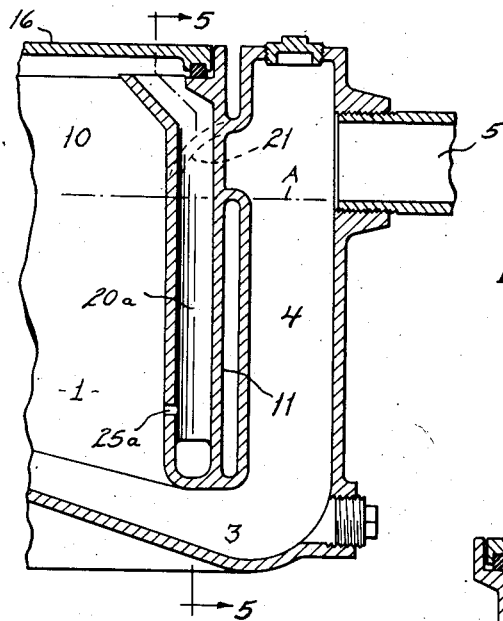
Figure 5:
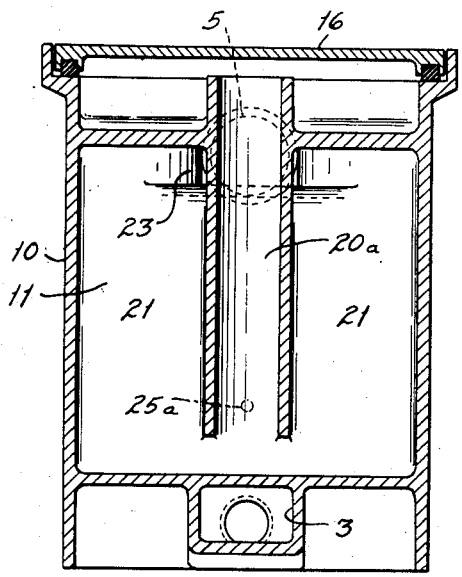
Figure 6:
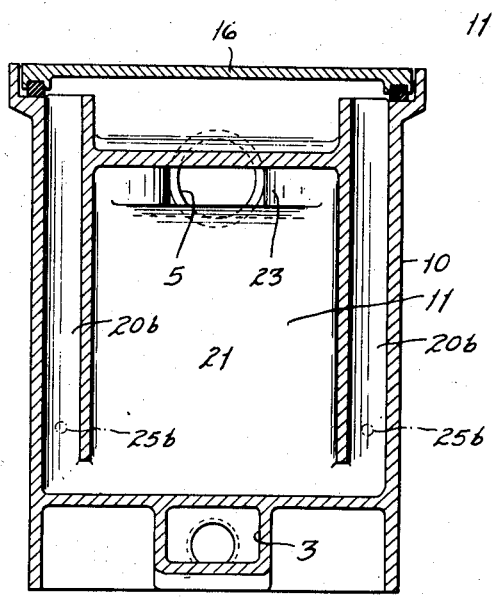

Further and more specific objects of my invention will appear from the following description given in connection with the accompanying drawings, where Fig. 1 is a centrally located vertical cross-section through a clarifying apparatus, embodying my invention; Fig. 2 is a horizontal cross-section taken along the line 2—2 in Fig. 1; Fig. 3 is a fragmentary horizontal cross-section illustrating another form of my invention; Fig. 4 is a centrally located vertical cross-section of the modification shown in Fig. 3; Fig. 5 is a vertical cross-section taken along the line 5—5 in Fig. 4; and Fig. 6 is a vertical section, similar to Fig. 5, showing another form of my invention which is illustrated by the broken lines interposed on Fig. 3.

As stated in one of the objects of my present invention, I propose the provision of a grease and oil trap construction which can be used without being equipped with a separate vent line, such as has been the expensive practice heretofore. Should a grease trap of any one of the several types now in commercial use be installed without a vent line, and the trap be disposed a substantial distance below a dish washer or other source of greasy or oily water and no vent line be provided, a sudden rush of the waste water into the trap would create a hydrostatic condition and cause the gases and air between the top level of the water and grease in the trap and the cover thereof to be compressed.

The compression of the water and gases within the top portion of the trap, brings about a sudden and violent reaction in the nature of an air and a gas expansion which immediately causes an ejection of not only the water present in the trap but also the fatty matters which it is desired to retain in the trap, this ejection taking place through the outlet end of the trap. Thus, the very purpose and function of the trap is negatived. The present invention contemplates an automatic self-venting feature in the trap construction, so that when gas and air pressure forms in the top of the trap for the reasons above stated, it will permit automatic venting of the compressed gases directly to the outlet of the trap, thus preventing the building up of a sufficiently high gas or air pressure to cause any appreciable fluctuation in the normal level of the water in the trap.

Referring now to Fig. 1, I have shown a clarifying apparatus having a basin 1, a waste water inlet 2, and a discharge opening 3. A vertical discharge tube 4 communicates with the opening 3 and discharges into the drain pipe 5, which is maintained at the same level as the inlet 2.

The basin 1 for accumulating the fatty waste material has side walls 10, end walls 11, and a bottom 12. The bottom 12 is constructed so that it slopes from the inlet end to the discharge opening, and a central channel 13 is provided in the sloping bottom so that acceleration of the lower level of the waste water will be produced. A deflecting baffle plate 14 is secured to the side walls of the basin 1, by means of lugs cast integrally with the wall. The water thus entering the basin from the inlet 2 is deflected downwardly around the baffle 14, and agitation is produced.

A second baffle plate 15 is disposed between the side walls 10, so that its upper extremity extends beyond the water level to be maintained. Thus a quiescent zone is established around the baffle plate 15 and the remaining portion of the basin 1 adjacent the outlet opening. A cover plate 16 completely encloses the space above the basin 1 and suitable packing is provided around the edges of the cover plate. Fastening means 17 provide a clamping pressure to maintain the cover plate in a sealed position relative to the trap.

When the waste water enters by the inlet 2 it is diverted and distributed across the width of the basin by the baffle 14. It is advisable to fill the basin 1 with clear water to a level such as indicated by the line A, to prevent greasy water from reaching the outlet. The level A will be maintained as soon as the stability of the device is reached after the frictional resistance to flow at the discharge end has been overcome. The level maintained in the basin 11 with respect to the discharge opening 5 is commonly known to hydraulic engineers as the "hydraulic grade line". Once this condition is established, the grease will always collect at the same elevation in the quiescent zone before and behind the baffle plate 15, so long as a constant water level is maintained.

If a large surge or hydraulic head is produced in the inlet pipe 2, the water level A will have the tendency to slightly rise. Along with the waste water there will be a quantity of air carried by the water, as it enters the basin 1. The liberation of this air and a surge produced by a greater quantity of water flowing into the basin 1, will cause a pressure to be exerted in the air space B above the water level A. Unless this pressure is immediately relieved, the water level A will lower until all the water is exhausted from the basin 1, by the combined effect of the pressure in the air space B, together with the syphonic action produced by outward flow in the pipe 5. As water is a non-compressible liquid, this condition will repeat itself whenever sufficient pressure is produced in the space B above the liquid line. Thus a surge produced by a great quantity of water entering the basin will disrupt the quiescent state of the liquid line and a great amount of the fatty material collected on the surface thereof will be lost in the discharge pipe.

To obviate this condition, I have provided means for relieving any accumulation of air pressure beyond normal in the space B above the water line. This is accomplished without breaking the water seal effected by the trap 4. The air relief device consists of a column or tube 20, vertically disposed within the basin 1. Its upper portion extends well into the air space B, so that it is free from any accumulation of grease forming above the surface of the water. The lower end of the column 20 communicates with a similar vertical column of water 21 at the point 22 near the bottom of the basin 1. The top portion of the column 21 discharges into the opening 5 at substantially the water level line through the opening 23. In the lower portion of the column 21 I have provided a small opening 25, so that under normal conditions the columns 20 and 21 will remain filled with water and in balance, at substantially the water level line A.

When a surge occurs in the inlet pipe 2, the pressure built up in the air space B will dissipate itself by lowering the level of the water in the column 20. After the initial surge has passed, and the device again resumes normal conditions, the level in the column 20 will again rise to the water level line A, by reason of the refilling hole 25. In the event that the surge is a great one, and the column 20 is not sufficient to balance the pressure produced in the air space B, then the water in the column 20 will recede downwardly until the point 22 is reached. When this condition occurs, the air will infiltrate into the water and bubble up through the tube 21 and thereby be liberated out of the opening 23 and carried into the discharge pipe 5. If the pressure in the space B be great enough, the water in the passageways 20 and 21 will be almost completely ejected. However, as soon as the surge is relieved the water seal between the discharge pipe 5 and the basin 1 will be reestablished immediately through the refilling hole 25.

It has been found that the sensitivity with which the water level may be maintained, is somewhat dependent upon the comparative sizes of the columns 20 and 21, and their internal characteristics as well as their relationship to the size of the basin. The time element is of importance in that the small quantity of water in the tube 20 moves more rapidly to relieve the pressure in the space B than does the greater quantity of water in the basin 1, which is subject to the same pressure. This is due to the fact that the pressure will be relieved at a place which offers the least resistance to its escape. It is easier to momentarily move the small quantity in the tube 20 than it is to overcome the inertia and move the large body of water in the basin 1, whenever a sudden surge occurs.

To accomplish my invention, any size tubing may be used in place of the columns 20 or 21, as illustrated. These may be circular, oval or any other shape that is convenient to cast. By increasing the size of the column 21 with respect to the column 20, I find that the limits within which the water level A will fluctuate, are greatly diminished. If the column 20 were of greater size than the column 21, a choking effect would occur in the leg 21, for the reason that the smaller column would offer a restriction or throttle to the discharge of the water. Thus, by diminishing the size of the column 20 with respect to the column 21, the former is quickly emptied into the larger column and the air may then bubble or escape up through the water remaining in the column, or, as stated, may eject the water from column 21, but only under flowing conditions. This principle is important as it is required under the present building, plumbing and sanitation codes to maintain a trap or water seal between the basin 1 and the discharge pipe 5.

I have shown in Fig. 2 the columns 20 and 21 as substantially oblong in cross-section. As previously stated, this construction is not the only form which will accomplish my invention. The columns may be of various shape or the smaller column 20 may be disposed within the larger column 21, in which case the air would be exhausted downwardly through the center tube 20 and upwardly through the outer column 21. This latter construction is shown in Figs. 3, 4 and 5 as another form of my invention.

The column 20a in Figs. 3, 4 and 5 is centrally located within the column 21, and the refilling hole 25a is correspondingly placed, as illustrated with reference to Fig. 1. To avoid any obstruction of the passageway 23 by the upward extension of the tube 20a, I have shown as another form of my invention in Figs. 3 and 6 the tubes 20b disposed, either singularly or in plurality, at the corners of the column 21. Openings 25b are similarly placed in each tube in order to refill the tubes, as previously described.

It may thus be seen that I have invented a new and useful improvement in grease interceptors, whereby the water level may be retained with sufficient accuracy so that mechanical means may be employed for removing the grease therefrom. It is also apparent that the maintenance of the water level increases the efficiency of operation of the interceptor and the removal of fatty waste material from the waste waters.

I claim:

1. In a clarifying apparatus for waste water, an enclosed basin having an inlet and having an outlet arranged to maintain a normal water level in the basin below the top thereof, conduit means for containing a column of water opening into the outlet and extending substantially below the water level in the basin, a second conduit means communicating with the lower extremity of the first named means, and extending upwardly into and communicating with the space above the water in the basin.

2. In a clarifying apparatus for waste water, an enclosed basin having an inlet and having an outlet arranged to maintain a normal water level in the basin below the top thereof, conduit means for containing a column of water opening into the outlet and extending substantially below the water level in the basin, a second conduit means communicating with the lower extremity of the first named means, and extending upwardly into and communicating with the space above the water in the basin, and an opening in said second conduit means disposed below the level of the water so that the column may be refilled and maintained at the same level as the water in the basin.

3. A device for separating waste material from waste water, comprising an enclosed basin having an inlet and having an outlet arranged to maintain a normal water level in the basin below the top thereof, conduit means for containing a column of water opening into the outlet at the normal water level and extending below the surface thereof, a second conduit means of lesser cross-section than said first-named means communicating with the lower extremity of said first-named means and extending into the space above the level of the water in the basin, and an opening in said last-named means located below the surface of the water, so that the level of the water in the columns will normally be the same as the level in the basin.

4. An apparatus for separating fatty waste material from waste water, comprising an enclosed basin having an inlet and having an outlet arranged to maintain a normal water level in the basin below the top thereof, conduit means for containing a column of water opening into the outlet and extending below the surface of the water in the basin, a second conduit means disposed within the first-named means and communicating with the same at its lower extremity, said second means extending upwardly into the space above the water level in the basin.

5. In a device for separating fatty material from waste waters, an enclosed basin having an inlet and an outlet arranged to maintain a normal water level in the basin below the top thereof, conduit means for containing a column of water opening into the outlet and extending below the surface of the water in the basin, and a plurality of other conduit means communicating with the lower extremity of the first-named means and extending upwardly into the space above the surface of the water in the basin.

6. In a device for collecting fatty waste material from water, an enclosed basin having an inlet and having an outlet arranged to maintain a normal water level in the basin below the top thereof, conduit means for containing a column of water opening into the outlet at the level of the water in the basin, a plurality of other conduit means communicating with the lower extremity of the first-named means and extending upwardly into the space above the level of the water in the basin, and a small opening disposed in each of said last-named means, substantially below the level of the water, so that the columns may be refilled and maintained at the same level as the water in the basin.

7. In a device for separating fatty material from waste waters, an enclosed basin having an inlet and having an outlet arranged to maintain a normal water level in the basin below the top thereof, conduit means for containing a column of water opening into the outlet at substantially the level of the water in the basin and extending below the surface thereof, a plurality of other conduit means having a cross-sectional area of less than that of the first-named means and communicating with the lower extremity of said first-named means, and extending upwardly into the space above the surface of the water in the basin, and an opening in each of said last-named means, located below the surface of the water in the basin and communicating therewith so that the columns will maintain the same level as the water in the basin.

8. In an apparatus for separating fatty waste material from water, an enclosed basin having an inlet and having an outlet arranged to maintain a normal water level in the basin below the top thereof, conduit means for containing a column of water opening into the outlet and extending substantially below the level of the water in the basin, a plurality of other conduit means disposed within the first-named means and communicating with the same near its lower extremity, said last-named means, each extending upwardly into the space above the surface of the water in the basin.

9. In an apparatus for separating fatty waste material from waste water, an enclosed basin having an inlet and having an outlet arranged to maintain a normal water level below the top thereof, conduit means for containing a column of water opening into the outlet and extending below the surface of the water in the basin, a plurality of other conduit means disposed within the first-named means and communicating with the same at its lower extremity, said last-named means each extending upwardly into the space above the water level, and a small opening in each of said last-named means disposed below the level of the water in the basin so that the said columns may communicate with the water in the basin.

10. In a clarifying apparatus for waste water, an enclosed basin having an inlet and an outlet arranged to maintain a normal water level in the basin below the top thereof, a discharge tube extending between the basin and the outlet to form a water seal for the basin, and means communicating with the outlet for relieving an accumulation of gases in the space above the level of the water in the basin without breaking the water seal or permitting the return of gases from the outlet to the basin.

JOSEPH HIRSHSTEIN.